US008634398B2

(12) United States Patent
Nam et al.

(10) Patent No.: US 8,634,398 B2
(45) Date of Patent: Jan. 21, 2014

(54) METHOD AND SYSTEM FOR MAPPING HARQ-ACK BITS

(75) Inventors: Young-Han Nam, Richardson, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 327 days.

(21) Appl. No.: 13/152,121

(22) Filed: Jun. 2, 2011

(65) Prior Publication Data

US 2011/0310823 A1 Dec. 22, 2011

Related U.S. Application Data

(60) Provisional application No. 61/356,488, filed on Jun. 18, 2010.

(51) Int. Cl.
*H04Q 7/28* (2006.01)

(52) U.S. Cl.
USPC ............ 370/341; 370/252; 370/328; 370/329

(58) Field of Classification Search
USPC .................... 370/328, 252, 329, 341
See application file for complete search history.

(56) References Cited

U.S. PATENT DOCUMENTS

| 8,422,429 | B2 * | 4/2013 | Nam et al. | 370/328 |
| 2010/0195575 | A1 * | 8/2010 | Papasakellariou et al. | 370/328 |
| 2010/0271970 | A1 * | 10/2010 | Pan et al. | 370/252 |
| 2011/0268080 | A1 * | 11/2011 | Luo et al. | 370/330 |
| 2011/0274043 | A1 * | 11/2011 | Nam et al. | 370/328 |
| 2012/0113827 | A1 * | 5/2012 | Yamada et al. | 370/252 |

OTHER PUBLICATIONS

Provisional U.S. Appl. No. 61/330,852, filed May 3, 2010.*
International Search Report dated Feb. 8, 2012 in connection with International Patent Application No. PCT/KR2011/004447.
Written Opinion of the International Searching Authority dated Feb. 8, 2012 in connection with International Patent Application No. PCT/KR2011/004447.
"Uplink ACK/NACK for Carrier Aggregation", Motorola, 3GPP TSG RAN1#60, San Franisco, USA, Feb. 22-26, 2010, 3 pages.
"ACK/NACK resource allocation in LTE-A", LG Electronics, 3GPP TSG RAN WG1 #61, Montreal, Canada, May 10-14, 2010, 5 pages.
"Uplink ACK/NACK resource allocation in TDD", 3GPP TSG WG1 #52bis, LG Electronics, Shenzhen, China, Mar. 31-Apr. 4, 2008, 5 pages.

* cited by examiner

*Primary Examiner* — Chuong T Ho

(57) ABSTRACT

A subscriber station is provided. The subscriber station includes a transmit path circuitry to transmit uplink control information (UCI) in a subframe comprising one or more resource blocks, each resource block comprising S SC-FDM symbols. Each of the S symbols comprises N virtual subcarriers, and each subcarrier of each symbol comprises a resource element. The subscriber station also includes a UCI symbol allocator to allocate a first vector sequence of HARQ-ACK bits to a control region of each of four symbols of a resource block, the control region allocated for HARQ-ACK bits. The UCI symbol allocator also allocates a second vector sequence of HARQ-ACK bits to a control region of a fifth symbol of the resource block when a condition is met. The control region of the fifth symbol can be allocated for rank information (RI) bits.

40 Claims, 11 Drawing Sheets

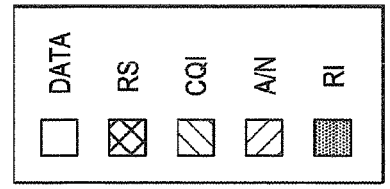
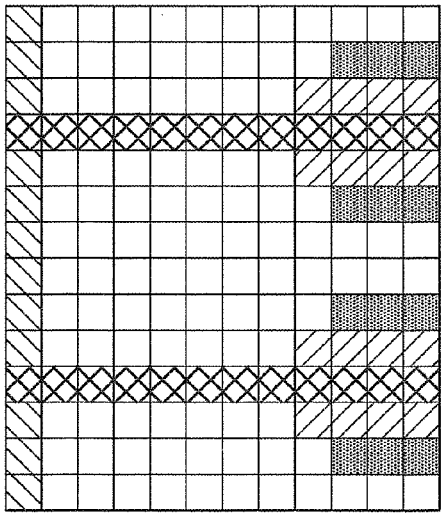
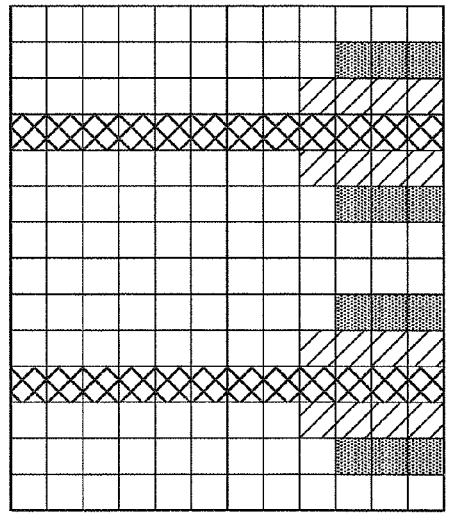
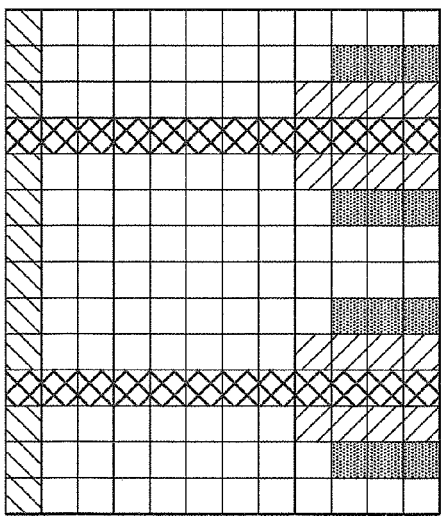
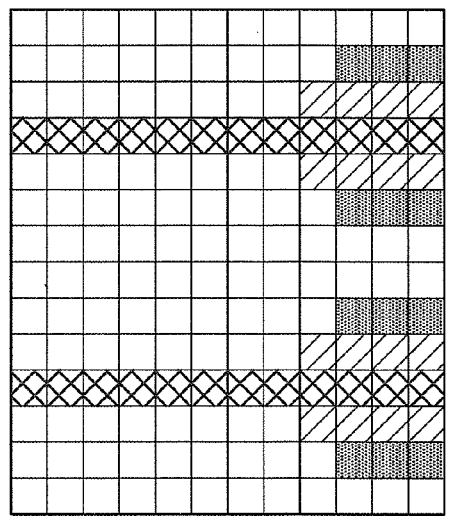
FIG. 7

| $Q_m$ | ENCODED HARQ-ACK |
|---|---|
| 2 | $[o_0^{ACK} \, y]$ |
| 4 | $[o_0^{ACK} \, y \, x \, x]$ |
| 6 | $[o_0^{ACK} \, y \, x \, x \, x \, x]$ |

FIG. 8

| $Q_m$ | ENCODED HARQ-ACK |
|---|---|
| 2 | $[o_0^{ACK} \, o_1^{ACK} \, o_2^{ACK} \, o_0^{ACK} \, o_1^{ACK} \, o_2^{ACK}]$ |
| 4 | $[o_0^{ACK} \, o_1^{ACK} \, x \, x \, o_2^{ACK} \, o_0^{ACK} \, x \, x \, o_1^{ACK} \, o_2^{ACK} \, x \, x]$ |
| 6 | $[o_0^{ACK} \, o_1^{ACK} \, x \, x \, x \, x \, o_2^{ACK} \, o_0^{ACK} \, x \, x \, x \, x \, o_1^{ACK} \, o_2^{ACK} \, x \, x \, x \, x]$ |

FIG. 9

| CP CONFIGURATION | COLUMN SET |
|---|---|
| NORMAL | {1, 4, 7, 10} |
| EXTENDED | {0, 3, 5, 8} |

FIG. 11

| CP CONFIGURATION | COLUMN SET |
|---|---|
| NORMAL | {2, 3, 8, 9} |
| EXTENDED | {1, 2, 6, 7} |

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

| ROWS\COLUMNS | 0 | 1 | 2 | 3 | 4 | ⋯ | 7 | 8 | 9 | 10 |
|---|---|---|---|---|---|---|---|---|---|---|
| 0 | | $q^{ACK}_{4R'_{mux}+3}$ | ⋮ | $q^{ACK}_{4R'_{mux}-1}$ | $q^{ACK}_{4R'_{mux}}$ | ⋯ | $q^{ACK}_{4R'_{mux}+1}$ | ⋮ | ⋮ | $q^{ACK}_{4R'_{mux}+2}$ |
| 1 | | | ⋮ | ⋮ | $q^{ACK}_{4R'_{mux}+4}$ | ⋯ | | ⋮ | | |
| ⋮ | | | ⋮ | ⋮ | | ⋯ | | ⋮ | | |
| $R'_{mux}-2$ | | | $q^{ACK}_{4}$ | | | | | | | |
| $R'_{mux}-1$ | | | $q^{ACK}_{0}$ | $q^{ACK}_{3}$ | | | | $q^{ACK}_{2}$ | $q^{ACK}_{1}$ | |

| ROWS\COLUMNS | 0 | 1 | 2 | 3 | 4 | ⋯ | 7 | 8 | 9 | 10 |
|---|---|---|---|---|---|---|---|---|---|---|
| 0 | | $q^{ACK}_{4R'_{mux}+4}$ | ⋮ | $q^{ACK}_{4R'_{mux}-1}$ | | ⋯ | $q^{ACK}_{4R'_{mux}+2}$ | ⋮ | ⋮ | $q^{ACK}_{4R'_{mux}+1}$ |
| 1 | | $q^{ACK}_{4R'_{mux}}$ | $q^{ACK}_{4}$ | | $q^{ACK}_{4R'_{mux}+3}$ | ⋯ | | ⋮ | | |
| ⋮ | | | | | | | | ⋮ | | |
| $R'_{mux}-2$ | | | $q^{ACK}_{0}$ | $q^{ACK}_{3}$ | | | | $q^{ACK}_{2}$ | $q^{ACK}_{1}$ | |
| $R'_{mux}-1$ | | | | | | | | | | |

FIG. 14

| ROWS\COLUMNS | 0 | 1 | 2 | 3 | 4 | ... | 7 | 8 | 9 | 10 |
|---|---|---|---|---|---|---|---|---|---|---|
| 0 | | $q^{ACK}_{4R'_{mux}+2}$ | ... | $q^{ACK}_{4R'_{mux}-1}$ | | | $q^{ACK}_{4R'_{mux}+4}$ | | | $q^{ACK}_{4R'_{mux}+3}$ |
| ... | | $q^{RI}_4$ | ... | ... | ... | | $q^{ACK}_{4R'_{mux}}$ | | | |
| $R'_{mux}-3$ | | $q^{RI}_0$ | $q^{ACK}_4$ | ... | $q^{ACK}_{4R'_{mux}+1}$ | | $q^{RI}_2$ | | | $q^{RI}_5$ |
| $R'_{mux}-2$ | | | $q^{ACK}_0$ | $q^{ACK}_3$ | $q^{RI}_3$ | | $q^{ACK}_2$ | $q^{ACK}_1$ | $q^{RI}_1$ | |
| $R'_{mux}-1$ | | | | | | | | | | |

| ConfigHARQACKRegion IE STATE | INDICATED METHOD |
|---|---|
| 0 | HARQ-ACK REGION IS AS DEFINED IN Rel-8/9 LTE, OR, $Q^{max}_{ACK} = 4 \cdot M^{PUSCH}_{SC}$ |
| 1 | HARQ-ACK REGION IS EXPANDED ACCORDING TO EMBODIMENTS OF THIS DISCLOSURE |

METHOD AND SYSTEM FOR MAPPING HARQ-ACK BITS

CROSS-REFERENCE TO RELATED APPLICATION(S) AND CLAIM OF PRIORITY

The present application is related to U.S. Provisional Patent Application No. 61/356,488, filed Jun. 18, 2010, entitled "MULTIPLEXING OF CONTROL AND DATA IN AN UPLINK MIMO SYSTEM ALLOWING BETTER PROTECTION OF CONTROL". Provisional Patent Application No. 61/356,488 is assigned to the assignee of the present application and is hereby incorporated by reference into the present application as if fully set forth herein. The present application hereby claims priority under 35 U.S.C. §119(e) to U.S. Provisional Patent Application No. 61/356,488.

TECHNICAL FIELD OF THE INVENTION

The present application relates generally to wireless communications and, more specifically, to a method and system for mapping HARQ-ACK bits.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A subscriber station is provided. The subscriber station comprises a transmit path circuitry configured to transmit uplink control information (UCI) in a subframe comprising one or more resource blocks, each resource block comprising S single carrier frequency division multiplexing (SC-FDM) symbols. Each of the S symbols comprises N virtual subcarriers, and each subcarrier of each symbol comprises a resource element. The subscriber station also comprises a UCI symbol allocator configured to allocate a first vector sequence of hybrid automatic-repeat-request acknowledgement (HARQ-ACK) bits to a control region of each of four symbols of a resource block, the control region allocated for HARQ-ACK bits. The UCI symbol allocator is further configured allocate a second vector sequence of HARQ-ACK bits to a control region of a fifth symbol of the resource block when a condition is met. The control region of the fifth symbol can be allocated for rank information (RI) bits.

A method of operating a subscriber station is provided. The method comprises transmitting uplink control information (UCI) in a subframe comprising one or more resource blocks, each resource block comprising S single carrier frequency division multiplexing (SC-FDM) symbols. Each of the S symbols comprises N virtual subcarriers, and each subcarrier of each symbol comprises a resource element. The method also comprises allocating a first vector sequence of hybrid automatic-repeat-request acknowledgement (HARQ-ACK) bits to a control region of each of four symbols of a resource block, the control region allocated for HARQ-ACK bits. The method further includes allocating a second vector sequence of HARQ-ACK bits to a control region of a fifth symbol of the resource block when a condition is met. The control region of the fifth symbol can be allocated for rank information (RI) bits.

A base station is provided. The base station comprises a receive path circuitry configured to receive uplink control information (UCI) in a subframe comprising one or more resource blocks, each resource block comprising S single carrier frequency division multiplexing (SC-FDM) symbols. Each of the S symbols comprises N virtual subcarriers, and each subcarrier of each symbol comprises a resource element. The receive path circuitry is also configured to receive a first vector sequence of hybrid automatic-repeat-request acknowledgement (HARQ-ACK) bits in a control region of each of four symbols of a resource block, the control region allocated for HARQ-ACK bits. The receive path circuitry is further configured to receive a second vector sequence of HARQ-ACK bits in a control region of a fifth symbol of the resource block when a condition is met. The control region of the fifth symbol can be allocated for rank information (RI) bits.

A method of operating a base station is provided. The method comprises receiving uplink control information (UCI) in a subframe comprising one or more resource blocks, each resource block comprising S single carrier frequency division multiplexing (SC-FDM) symbols. Each of the S symbols comprises N virtual subcarriers, and each subcarrier of each symbol comprises a resource element. The method also includes receiving a first vector sequence of hybrid automatic-repeat-request acknowledgement (HARQ-ACK) bits in a control region of each of four symbols of a resource block, the control region allocated for HARQ-ACK information bits. The method further includes receiving a second vector sequence of HARQ-ACK bits in a control region of a fifth symbol of the resource block when a condition is met. The control region of the fifth symbol can be allocated for rank information (RI) bits.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a mapping of uplink control information onto a plurality of layers of two codewords according to an embodiment of this disclosure;

FIG. 8 illustrates a table depicting encoding of 1-bit hybrid automatic-repeat-request acknowledgement (HARQ-ACK) according to an embodiment of this disclosure;

FIG. 9 illustrates a table depicting encoding of 2-bit HARQ-ACK according to an embodiment of this disclosure;

FIG. 10 illustrates a table depicting basis sequences for (32,O) code according to an embodiment of this disclosure;

FIG. 11 illustrates a table depicting column sets for the insertion of rank information according to an embodiment of this disclosure;

FIG. 12 illustrates a table depicting encoding of 2-bit HARQ-ACK according to an embodiment of this disclosure;

FIG. 13 illustrates a table depicting HARQ-ACK mapping according to an embodiment of this disclosure;

FIG. 14 illustrates a table depicting HARQ-ACK mapping according to another embodiment of this disclosure;

FIG. 15 illustrates a table depicting HARQ-ACK mapping according to a further embodiment of this disclosure;

FIG. 16 is a table illustrating the indication of two states by an information element according to an embodiment of this disclosure;

DETAILED DESCRIPTION OF THE INVENTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE terms "node B", "enhanced node B", and "eNodeB" are other terms for "base station" used below. Also, the LTE term "user equipment" or "UE" is another term for "subscriber station" used below.

Figure 1:
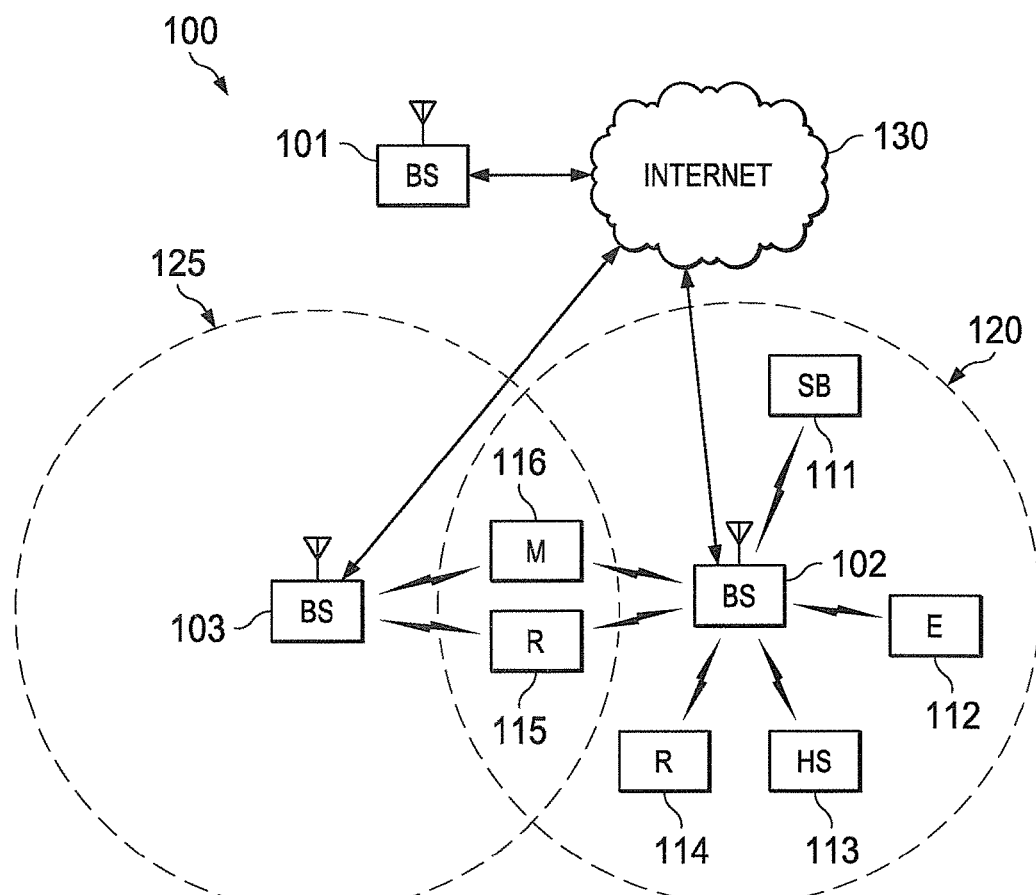
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
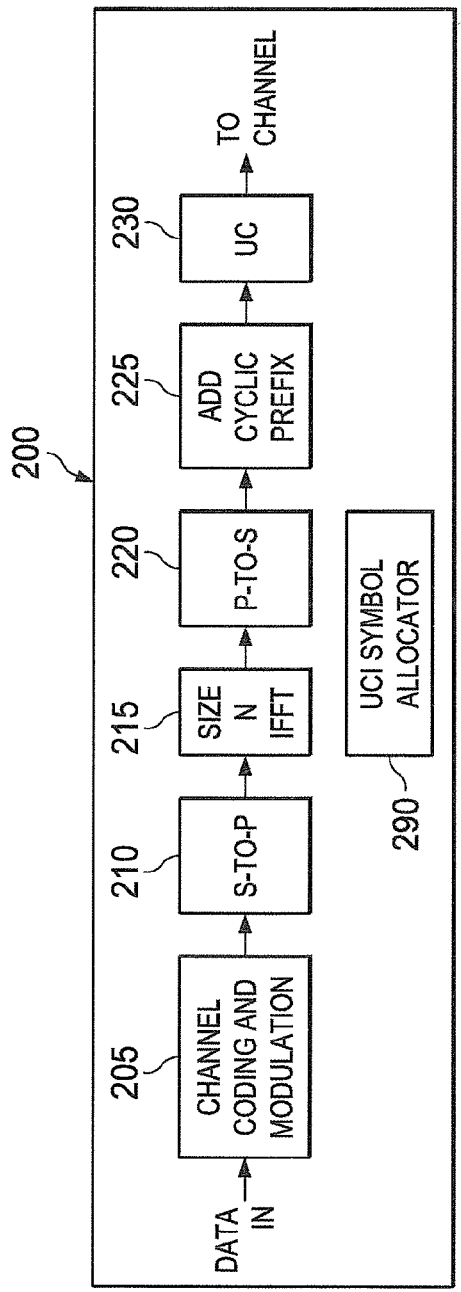
FIG. 2 is a high-level diagram of an orthogonal frequency division multiple access (OFDMA) transmitter according to one embodiment of this disclosure.
Figure 3:
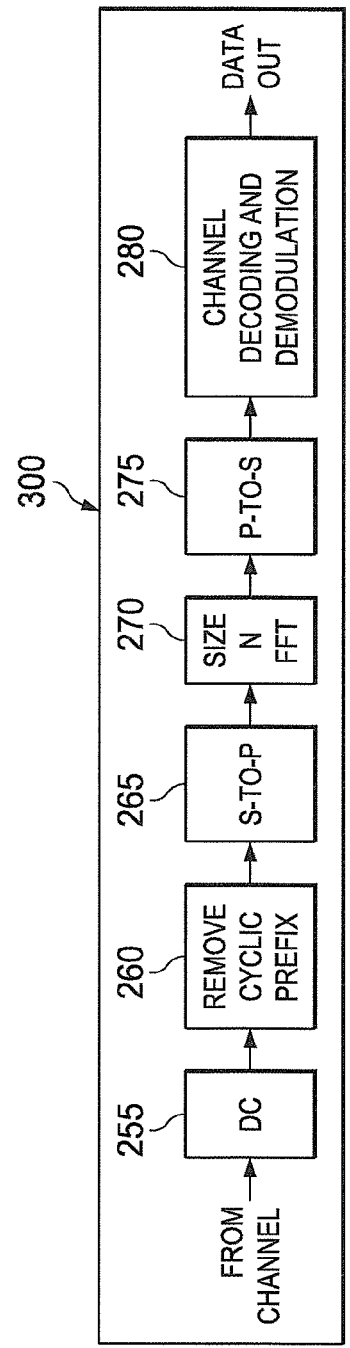
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, and an uplink control information (UCI) symbol allocator 290.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, UCI symbol allocator 290 is operable to dynamically allocate UCI symbols in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where k=0, . . . , $N_{RB}^{DL} N_{sc}^{RB} - 1$ and l=0, . . . , $N_{symb}^{DL} - 1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
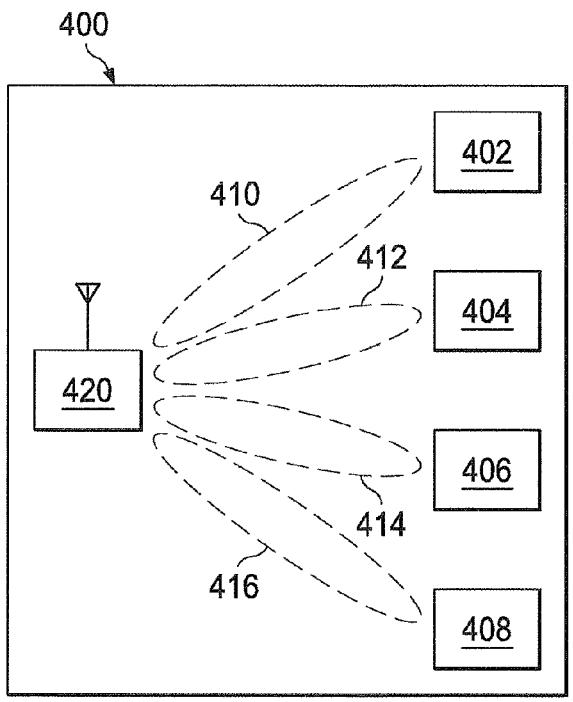
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
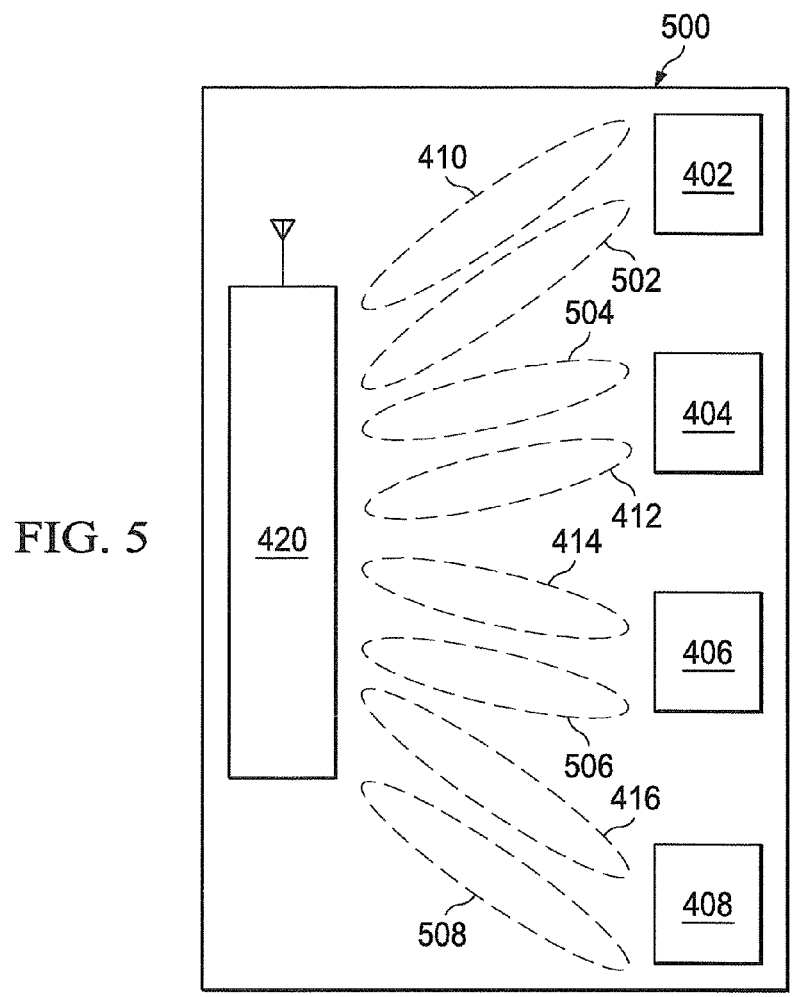
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

In 3GPP Long Term Evolution Advanced (LTE-A) Rel-10, UL MIMO spatial multiplexing (SM) is introduced. When a UE is scheduled to transmit signals in a subframe using a UL-MIMO SM scheme in LTE-A, the UE can transmit up to two codewords (CWs) in the subframe.

In addition, in 3GPP RAN1#61, the following is agreed for control and data multiplexing in UL MIMO.

Hybrid automatic-repeat-request acknowledgement (HARQ-ACK) and rank information (RI) are:
   replicated across all layers of both CWs; and
   time division multiplexing (TDM) multiplexed with data such that uplink control information (UCI) symbols are time-aligned across all layers.
channel quality information (CQI)/precoding matrix information (PMI):
   is transmitted only on 1 codeword; and
   reuses Rel-8 multiplexing and channel interleaving mechanisms. Extension: The input to data-control multiplexing $\{q_0,q_1,q_2,q_3, \ldots, q_{Q_{CQI}-1},f_0,f_1,f_2,f_3, \ldots, f_{G-1}\}$ is grouped into column vectors of $\underline{g}_0,\underline{g}_1,\underline{g}_2,\underline{g}_3, \ldots, \underline{g}_{H'-1}$ length Q_m*L. L (1 or 2) is the number of layers the CW is mapped onto. This enables time (RE) alignment across 2 layers for L=2; and
   UCI symbol-level layer mapping is the same as (treated as a part of) data.
UCI refers to at least one of HARQ-ACK, RI, CQI/PMI.

Figure 6:
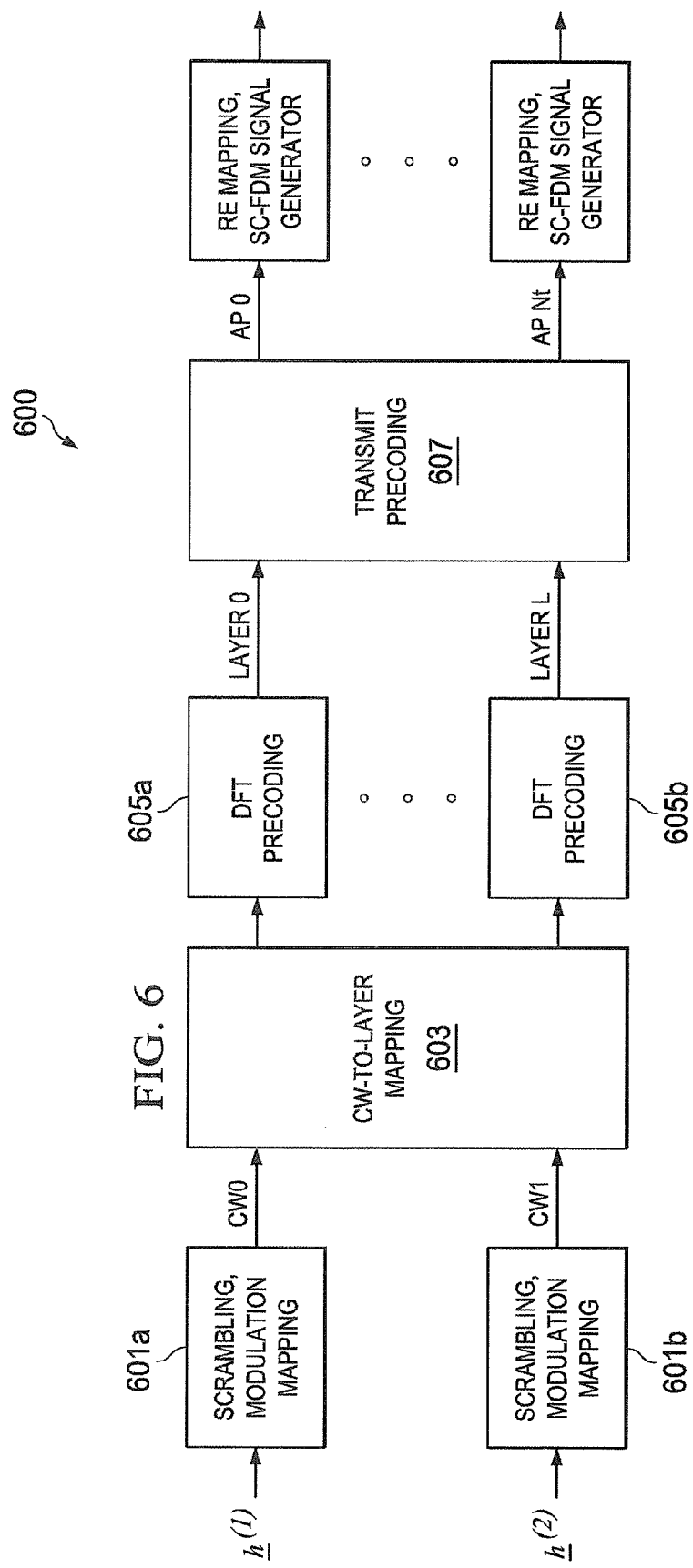
FIG. 6 illustrates a transmission according to an embodiment of this disclosure.

FIG. 6 illustrates a transmission chain 600 according to an embodiment of this disclosure.

The transmission chain 600 is for use with LTE-A Rel-10 UL MIMO SM allowing up to two-CW transmission. As shown in FIG. 6, when two CWs are to be transmitted in a subframe, two bit-streams $h^{(1)}$ and $h^{(2)}$ for the two CWs are separately generated, where $\overline{h}^{(q)}=[\overline{h}_0^{(q)},h_1^{(q)}, \ldots, h_{H+Q_{RI}-1}]$, where $q \in \{1,2\}$. The two input streams $h^{(1)}$ and $h^{(2)}$ separately go through scrambling and modulation mapping at modulation mapping blocks 601a and 601b, respectively. The output of each modulation mapping block 601a and 601b is a CW. Up to two CWs are input to a CW-to-layer mapping block 603 whose outputs are layers, which are L modulation symbol streams. Then, each of the L modulation symbol streams from modulation mapping blocks 601a and 601b is input to a transform (or DFT) precoder 605a and 605b, respectively. The outputs of the DFT precoders 605a and 605b are input to the transmit precoding block 607. The transmit precoding block 607 generates $N_t$ modulation symbols streams, each of which will be transmitted in a transmit antenna port.

One of the key components of this uplink transmission is the data/control multiplexing function, which is fully specified in 3GPP Technical Specification No. 36.212, version 9.1.0, "E-UTRA, Multiplexing and Channel Coding", March 2010 and is hereby incorporated by reference into the present application as if fully set forth herein.

FIG. 7 illustrates a mapping 700 of uplink control information onto a plurality of layers of two codewords according to an embodiment of this disclosure.

In some embodiments, uplink control information (UCI) requiring more reliable transmissions (A/N and RI) are transmitted in all the layers, while UCI having a less stringent reliability requirement (CQI/PMI) are transmitted in a subset of layers, e.g., all the layers corresponding to one CW out of the two codewords (CWs) transmitted in a subframe, where the one CW is selected according to (1) the number of CWs; (2) the CW to layer mapping structure; (3) the CW that uses the highest MCS value; or (4) a fixed CW, e.g., the first CW or the second CW. For example, if N=4 and layers 1,2 are used for codeword 1 transmission while layers 3,4 are used for codeword 2 transmission, and if the MCS used by codeword 1 is better than the MCS used by codeword 2, then the UE can decide to transmit CQI/PMI on layers 1 and 2, which corresponds to the layers with a better MCS, while A/N and RI are transmitted on all the layers 1, 2, 3 and 4, as shown in FIG. 7.

In addition, the sizes of the three control regions (CQI, RI, A/N) are determined as a function of the corresponding UCI size and the MCS value associated with the layer on which the control regions are transmitted, and a higher layer signaled offset. In some embodiments, the calculation of control region sizes is similar to that specified in 3GPP LTE standard 3GPP Technical Specification No. 36.212, version 9.1.0, "E-UTRA, Multiplexing and Channel Coding", March 2010, which is hereby incorporated by reference into the present application as if fully set forth herein.

For example, the control region equation for HARQ and RI bits in section 5.2.2.6 of the above reference can be amended as follows:

$$Q' = \min\left(\left\lceil \frac{O \cdot M_{sc}^{PUSCH} \cdot N_{symb}^{PUSCH} \cdot \beta_{offset}^{PUSCH} \cdot N}{\sum_{n=1}^{N} \sum_{r=0}^{C(n)-1} K_{r,n}} \right\rceil, 4 \cdot M_{sc}^{PUSCH-current}\right).$$

Note that the inclusion of the factor "N", which denotes the number of layers, in the numerator and the sum in the denominator will be over all code blocks (CBs) in all layers. Here C(n) denotes the number of CBs in layer n, and $K_{r,n}$ denotes the size of the rth CB in layer n.

The subset of layers that contain control information is denoted as active layers. If the active layers have different MCS in their transmissions, then two embodiments apply.

In one embodiment, for each active layer, a per-layer control region size is determined according to the CQI/PMI size and the MCS on that particular layer. The total size of the control region is the sum of the per-layer control region sizes over the active layers. The control information is then distributed to the active layers, according to the per-layer control region size.

In this embodiment, one example of determining the overall control region size can be given by amending the two equations in section 5.2.2.6 of the above reference as follows:

$$Q'(n) = \min\left(\left\lceil \frac{O \cdot M_{sc}^{PUSCH} \cdot N_{symb}^{PUSCH} \cdot \beta_{offset}^{PUSCH}}{Ns \sum_{r=0}^{C(n)-1} K_{r,n}} \right\rceil, 4 \cdot M_{sc}^{PUSCH-current}\right),$$

for n=1, . . . Ns, where Q'(n) is the number of RI and A/N symbols in the nth active layer. In this example, the O information bits are evenly distributed to the Ns layers.

$$Q'(n) = \min\left(\left\lceil \frac{(O+L) \cdot M_{sc}^{PUSCH} \cdot N_{symb}^{PUSCH} \cdot \beta_{offset}^{PUSCH}}{Ns \sum_{r=0}^{C(n)-1} K_{r,n}} \right\rceil,\right.$$

$$\left. M_{sc}^{PUSCH-current} \cdot N_{symb}^{PUSCH-current} - \frac{Q_{RI}(n)}{Q_m}\right),$$

where Q'(n) is the number of CQI symbols in the nth active layer, and $Q_{RI}(n)$ is the number of RI symbols allocated on this active layer. In this example, the (O+L) information bits are evenly distributed to the Ns layers.

In another embodiment, the size Q' of the total control region is jointly determined as a function of the UCI size and the MCSs on all active layers, and the control information is distributed evenly across all the active layers, where each layer gets roughly 1/Ns of the total control region size.

For both embodiments, one example of determining the overall control region size can be given by amending the two equations in section 5.2.2.6 of the above reference as follows:

$$Q' = \min\left(\left\lceil \frac{O \cdot M_{sc}^{PUSCH} \cdot N_{symb}^{PUSCH} \cdot \beta_{offset}^{PUSCH} \cdot Ns}{\sum_{n=1}^{Ns} \sum_{r=0}^{C(n)-1} K_{r,n}} \right\rceil, 4 \cdot M_{sc}^{PUSCH-current} \cdot Ns\right).$$

For RI and A/N bits, note that the first summation on the denominator is summed over all active layers resulting in the following equation:

$$Q' = \min\left(\left\lceil \frac{(O+L) \cdot M_{sc}^{PUSCH} \cdot N_{symb}^{PUSCH} \cdot \beta_{offset}^{PUSCH} \cdot Ns}{\sum_{n=1}^{Ns} \sum_{r=0}^{C(n)-1} K_{r,n}} \right\rceil,\right.$$

$$\left. M_{sc}^{PUSCH-current} \cdot N_{symb}^{PUSCH-current} \cdot Ns - \frac{Q_{RI}}{Q_m}\right).$$

For CQI bits, $Q_{RI}$ is the total number of REs allocated for RI counted over all the active layers for CQI.

Furthermore, the UCI symbols can be ensured to be evenly distributed across all active layers. Let $$Q'' = Ns \cdot \left\lceil \frac{Q'}{Ns} \right\rceil,$$

and use Q'' as the total number of UCI symbols. A total of Q''−Q' symbols are added to ensure that all the active layers have the same number of UCI symbols.

In Rel-8/9 LTE, up to 4-bit A/N is piggybacked on a PUSCH. When a number of A/N bits is less than or equal to 2, the A/N bits are coded by (2,3) simplex code and the coded bits are appropriately repeated and mapped to REs to achieve a desired reliability. On the other hand, when the number of A/N bits is greater than 3 but less than or equal to 4, the A/N bits are coded by a (32,O) code and the coded bits are appropriately repeated and mapped to REs to achieve a desired reliability. Note that the (32,O) code can encode up to O=11 bits according to LTE specification 3GPP Technical Specification No. 36.212, version 9.1.0, "E-UTRA, Multiplexing and Channel Coding", March 2010.

FIG. 8 illustrates a table 800 depicting encoding of 1-bit hybrid automatic-repeat-request acknowledgement (HARQ-ACK) according to an embodiment of this disclosure.

FIG. 9 illustrates a table 900 depicting encoding of 2-bit HARQ-ACK according to an embodiment of this disclosure.

For HARQ-ACK:
  each positive acknowledgement (ACK) is encoded as a binary '1' and each negative acknowledgement (NACK) is encoded as a binary '0';
  if HARQ-ACK consists of 1-bit of information, i.e., $[o_0^{ACK}]$, HARQ-ACK is first encoded according to table 800; and
  if HARQ-ACK consists of 2-bits of information, i.e., $[o_0^{ACK} \, o_1^{ACK}]$ with $o_0^{ACK}$ corresponding to HARQ-ACK bit for codeword 0 and $O_1^{ACK}$ corresponding to that for codeword 1, HARQ-ACK is first encoded according to table 900 where $o_2^{ACK}=(o_0^{ACK}+o_1^{ACK}) \mod 2$.

The "x" and "y" in table 800 and 900 are placeholders for 3GPP Technical Specification No. 36.211, version 9.1.0, "E-UTRA, Physical channels and modulation", March 2010, which is hereby incorporated by reference into the present application as if fully set forth herein, to scramble the HARQ-ACK bits in a way that maximizes the Euclidean distance of the modulation symbols carrying HARQ-ACK information.

For the cases with frequency-division duplexing (FDD) or time-division duplexing (TDD) HARQ-ACK multiplexing when HARQ-ACK consists of one or two bits of information, the bit sequence $q_0^{ACK}, q_1^{ACK}, q_2^{ACK}, \ldots, q_{Q_{ACK}-1}^{ACK}$ is obtained by concatenation of multiple encoded HARQ-ACK blocks where $Q_{ACK}$ is the total number of coded bits for all the encoded HARQ-ACK blocks. The last concatenation of the encoded HARQ-ACK block may be partial so that the total bit sequence length is equal to $Q_{ACK}$.

FIG. 10 illustrates a table 1000 depicting basis sequences for (32,O) code according to an embodiment of this disclosure.

For the cases when HARQ-ACK consists of more than two bits information, i.e. $[o_0^{ACK} \, o_1^{ACK} \, \ldots \, o_{O^{ACK}-1}^{ACK}]$ with $O^{ACK}>2$, the bit sequence $q_0^{ACK}, q_1^{ACK}, q_2^{ACK}, \ldots, q_{Q_{ACK}-1}^{ACK}$ is obtained as $$q_i^{ACK} = \sum_{n=0}^{O^{ACK}-1} (o_n^{ACK} \cdot M_{(i \bmod 32),n}) \bmod 2,$$

where $i=0, 1, 2, \ldots, QACK-1$ and the basis sequences $M_{i,n}$ are defined in table 1000.

The vector sequence output of the channel coding for HARQ-ACK information is denoted by $q_0^{ACK}, q_1^{ACK}, \ldots, q_{Q'_{ACK}-1}^{ACK}$, where $Q'_{ACK}=Q_{ACK}/Q_m$, and is obtained as follows:

---

Set i, k to 0
while i < $Q_{ACK}$
$\underline{q}_k^{ACK} = [q_i^{ACK} \ldots q_{i+Q_m-1}^{ACK}]^T$

---

*-continued* i = i + $Q_m$
k = k + 1
end while

---

HARQ-ACK and RI are interleaved with UL data, according to a method described in 3GPP Technical Specification No. 36.212, version 9.1.0, "E-UTRA, Multiplexing and Channel Coding", March 2010.

FIG. 11 illustrates a table 1100 depicting column sets for the insertion of rank information according to an embodiment of this disclosure.

FIG. 12 illustrates a table 1200 depicting encoding of 2-bit HARQ-ACK according to an embodiment of this disclosure.

According to an embodiment of this disclosure, a channel interleaver implements a time-first mapping of modulation symbols onto the transmit waveform while ensuring that the HARQ-ACK information is present on both slots in the subframe and is mapped to resources around the uplink demodulation reference signals. The input to the channel interleaver are denoted by $g_0, g_1, g_2, \ldots, g_{H'-1}, q_0^{RI}, q_1^{RI}, q_2^{RI}, \ldots, q_{Q'_{RI}-1}^{RI}$ and $q_0^{ACK}, q_1^{ACK}, q_2^{ACK}, \ldots, q_{Q'_{ACK}-1}^{ACK}$. The number of modulation symbols in the subframe is given by $H''=H'+Q'_{RI}$. The output bit sequence from the channel interleaver is derived as follows:

1. Assign $C_{mux}=N_{symb}^{PUSCH}$ to be the number of columns of the matrix. The columns of the matrix are numbered 0, 1, 2, ..., $C_{mux}-1$ from left to right. $N_{symb}^{PUSCH}$ is determined according to section 5.2.2.6.

2. The number of rows of the matrix is $R_{mux}=(H'' \cdot Q_m)/C_{mux}$, and $R'_{mux}=R_{mux}/Q_m$ is defined. The rows of the rectangular matrix are numbered 0, 1, 2, ..., $R_{mux}-1$ from top to bottom.

3. If rank information is transmitted in this subframe, the vector sequence $q_0^{RI}, q_1^{RI}, q_2^{RI}, \ldots, q_{Q'_{RI}-1}^{RI}$ is written onto the columns indicated by table 1100, and by sets of $Q_m$ rows starting from the last row and moving upwards according to the following pseudocode:

---

Set i, j to 0
Set r to $R'_{mux}-1$
while i < $Q'_{RI}$
  $c_{RI}$ = Column Set(j)
  $\underline{y}_{r \times C_{mux} + c_{RI}} = \underline{q}_i^{RI}$
  i = i + 1
  r = $R'_{mux}-1-\lfloor i/4 \rfloor$
  j = (j + 3) mod 4
end while

---

Where ColumnSet is given in table 1100 and indexed left to right from 0 to 3.

4. Write the input vector sequence, for k=0, 1, ..., H'-1, into the ($R_{mux} \times C_{mux}$) matrix by sets of $Q_m$ rows starting with the vector $\underline{y}_0$ in column 0 and rows 0 to ($Q_m-1$) and skipping the matrix entries that are already occupied:

$$\begin{bmatrix} \underline{y}_0 & \underline{y}_1 & \underline{y}_2 & \cdots & \underline{y}_{C_{mux}-1} \\ \underline{y}_{C_{mux}} & \underline{y}_{C_{mux}+1} & \underline{y}_{C_{mux}+2} & \cdots & \underline{y}_{2C_{mux}-1} \\ \vdots & \vdots & \vdots & \ddots & \vdots \\ \underline{y}_{(R'_{mux}-1) \times C_{mux}} & \underline{y}_{(R'_{mux}-1) \times C_{mux}+1} & \underline{y}_{(R'_{mux}-1) \times C_{mux}+2} & \cdots & \underline{y}_{(R'_{mux} \times C_{mux}-1)} \end{bmatrix}$$

The pseudocode is as follows:

---

Set i, k to 0.
While k < H',
  if $\underline{y}_i$ is not assigned to RI symbols
    $\underline{y}_i = \underline{g}_k$
    k = k + 1
  end if
  i = i + 1
end While 5. If HARQ-ACK information is transmitted in this subframe, the vector sequence $q_0^{ACK}, q_1^{ACK}, q_2^{ACK}, \ldots, q_{Q'_{ACK}-1}^{ACK}$ is written onto the columns indicated by table 1200 and by sets of $Q_m$ rows starting from the last row and moving upwards according to the following pseudocode. Note that this operation overwrites some of the channel interleaver entries obtained in step 4.

```
Set i , j to 0.
Set r to R'_mux −1
while i < Q'_ACK
    c_ACK = ColumnSet(j)
    y_{r×C_mux + c_ACK} = q_i^{ACK}
    i = i + 1
    r = R'_mux −1−⌊i/4⌋
    j = (j + 3)mod 4
end while.
```

Where ColumnSet is given in table 1200 and indexed left to right from 0 to 3.

The output of the block interleaver is the bit sequence read out column by column from the $(R_{mux} \times C_{mux})$ matrix. The bits after channel interleaving are denoted by $h_0, h_1, h_2, \ldots, h_{H+Q_{RI}-1}$.

This disclosure provides methods and systems of multiplexing UL data (UL-SCH) and uplink control information (UCI) such as CQI (channel quality information), RI (rank information), A/N (Ack/Nack information, or HARQ-ACK) in the physical uplink shared channel (PUSCH). Throughout this disclosure, the uplink control information could be generated for a single component carrier or multiple component carriers in the case of carrier aggregation in systems such as LTE-advanced or LTE-A.

In some carrier aggregated systems, only one UE-specifically designated UL component carrier (CC), or a primary CC (PCC), carries UCI. In particular, when 5 DL CCs are configured for a UE in a frequency-division duplex (FDD) system, the UE should be able to feed back as large as 10~12 bits of HARQ-ACK, considering 2-transport block (TB) transmission in each CC and explicit discontinuous transmission (DTX) feedback. As current Rel-8/9 LTE specification is written under the assumption that the number of HARQ-ACK is as large as 4 bits in carrier aggregated systems such as LTE-A Rel-10 system, this disclosure provides a new design for HARQ-ACK transmissions to ensure the same level of HARQ-ACK transmission reliability as of Rel-8/9.

In this disclosure, a few methods of transmitting HARQ-ACK and RI piggybacked on the PUSCH, in the case of a large number (up to 10~12 bits) of HARQ-ACK bits, are provided that ensure a reliable transmission of the HARQ bits.

As described in table 1200 and the accompanying description above, HARQ-ACK bits can be placed in up to 4 columns (corresponding to 4 SC-FDMA symbols) in Rel-8/9 LTE. When $N_{PRB}$ uplink physical resource blocks (UL PRBs) are allocated, the maximum number of virtual REs that can be used for HARQ-ACK is $4M_{SC}^{PUSCH} = 4 \cdot 12 N_{PRB}$ in Rel-8/9 LTE. For a small number of HARQ-ACK information bits (e.g., up to 4 bits), $4M_{SC}^{PUSCH}$ virtual REs would be sufficient to provide a sufficient reliability. However, when the number of HARQ-ACK information bits is large (e.g., up to 10~12 bits), $4M_{SC}^{PUSCH}$ virtual REs may not be sufficient to provide a required reliability of HARQ-ACK transmission. Hence, this disclosure provides methods and systems of giving more than $4M_{SC}^{PUSCH}$ virtual REs for HARQ-ACK transmission in Rel-10 LTE-A system employing carrier aggregations.

However, additional HARQ-ACK virtual REs should not be placed arbitrarily in a PUSCH, as all the virtual REs in a PUSCH in Rel-8/9 are designated to carry some type of information, e.g., UL-SCH, CQI/PMI and RI.

In some embodiments, the HARQ-ACK region is expanded to the columns that carry RI in Rel-8/9.

In some embodiments, when HARQ-ACK information is transmitted at a UE, the UE first writes a vector sequence $q_0^{ACK}, q_1^{ACK}, q_2^{ACK}, \ldots, q_{Q'_{ACK}-1}^{ACK}$ onto the columns indicated by table 1200 according to the pseudo code described above in step 5. If $Q'_{ACK}$ is greater than $4R'_{mux}$ (in some cases, $4R'_{mux}$ is equal to $4M_{SC}^{PUSCH}$), the remaining vectors after filling the columns indicated by table 1200 are written onto another set of columns. In one example, the other set of columns is the column sets indicated by table 1100. In another example, the other set of columns is a column set {0,5,6,11} in a normal CP subframe, where the column set {0, 5, 6, 11} contains columns that does not belong to any of the column set defined for HARQ-ACK and RI in Rel-8/9, i.e., tables 1100 and 1200. The another column set can be fixed to be one set, e.g., a column set in table 1100, depending on the subframe type; semi-statically configured by radio resource control (RRC) signaling; or dynamically signaled in an UL grant downlink control information (DCI).

Note that this operation of writing HARQ-ACK symbol vectors overwrites some of the entries obtained in step 4 above.

FIG. 13 illustrates a table 1300 depicting HARQ-ACK mapping according to an embodiment of this disclosure.

FIG. 14 illustrates a table 1400 depicting HARQ-ACK mapping according to another embodiment of this disclosure.

FIG. 15 illustrates a table 1500 depicting HARQ-ACK mapping according to a further embodiment of this disclosure.

When the remaining vectors are written onto a column set in table 1100, a UE follows a method to write the HARQ-ACK vectors.

In a first embodiment, the remaining vectors are written onto the columns indicated by table 1100 in a reversed order as RI is written in step 3 by sets of $Q_m$ rows starting from the first row and moving downwards. This embodiment ensures a least chance of collision between the additional HARQ-ACK symbols and RI symbols.

For example, if $Q'_{ACK} = 4R'_{mux} + 5$, this embodiment would write the HARQ-ACK vectors in a normal CP subframe as shown in table 1300.

In a second embodiment, the remaining vectors are written onto the columns indicated by table 1100 in the same order as the RI is written in step 3 by sets of $Q_m$ rows starting from the last row and moving upwards. This embodiment is particularly suitable in a subframe where RI is not transmitted.

For example, if $Q'_{ACK} = 4R'_{mux} + 5$, this embodiment would write the HARQ-ACK vectors in a normal CP subframe as shown in table 1400.

A pseudo code for this embodiment can be written as follows:

```
Set i , j to 0.
Set r to R'_mux −1
while i < min ( Q'_ACK , 4R'_mux )
    c_ACK = ColumnSet_1(j)
    y_{r×C_mux + c_ACK} = q_i^{ACK}
    i = i + 1
    r = R'_mux −1−⌊i/4⌋
    j = (j + 3)mod 4
end while
```

```
Set j = 0 and k = 0.
Set r = R'_mux −1.
while i ≥ min( Q'_ACK ,4R'_mux ) and i < Q'_ACK ,
    c_ACK = ColumnSet_2(j)
    y_r×C_mux+c_ACK = q_k^ACK
    i = i + 1
    k = k + 1
    r = R'_mux −1−⌊k/4⌋
    j = (j + 3)mod 4
end while
```

Where ColumnSet1 and ColumnSet2 are respectively given in table 1200 and table 1100, and indexed left to right from 0 to 3.

In a third embodiment, the remaining vectors are written onto the columns indicated by table 1100 in the same order as the RI is written in step 3 by sets of $Q_m$ rows following the largest-numbered RI symbol vector and moving upwards. This embodiment is suitable in a subframe where RI is also transmitted, and this embodiment reduces the possibility of collision between HARQ-ACK and CQI/PMI, and completely removes collision between HARQ-ACK and RI.

For example, if $Q'_{ACK}=4R'_{mux}+5$ and $Q'_{RI}=6$, this embodiment writes the HARQ-ACK vectors in a normal CP subframe as shown in table 1500.

A pseudo code for this embodiment can be written as follows:

```
Set i , j to 0.
Set r to R'_mux −1
while i < min ( Q'_ACK , 4R'_mux )
    c_ACK = ColumnSet_1(j)
    y_r×C_mux+c_ACK = q_i^ACK
    i = i + 1
    r = R'_mux −1−⌊i/4⌋
    j = (j + 3)mod 4
end while
Set j = (3Q'_RI )mod 4 and k = Q'_RI .
Set r = R'_mux −1−⌊Q'_RI /4⌋.
while i ≥ min( Q'_ACK ,4R'_mux ) and i < Q'_ACK ,
    c_ACK = ColumnSet_2(j)
    y_r×C_mux+c_ACK = q_k^ACK
    i = i + 1
    k = k + 1
    r = R'_mux −1−⌊k/4⌋
    j = (j + 3)mod 4
end while
```

Where ColumnSet1 and ColumnSet2 are respectively given in table 1200 and table 1100, and indexed left to right from 0 to 3.

On the other hand, in Rel-8/9 LTE, the number of coded symbols Q' for HARQ-ACK is determined as, $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right),$$

where,

O is the number of HARQ-ACK information bits,
$\beta_{offset}^{PUSCH}=\beta_{offset}^{HARQ-ACK}$, which is determined according to 3GPP Technical Specification No. 36.213, version 9.1.0, "E-UTRA, Physical Layer Procedures", March 2010, which is hereby incorporated by reference into the present application as if fully set forth herein, $M_{sc}^{PUSCH-initial}$ is number of PUSCH subcarriers, C is the number of codeblocks in a TB to be transported, and $K_r$ is the number of information bits in r-th codeblock in the TB, all of which are obtained from the initial physical downlink control channel (PDCCH) for the same transport block.

Hence, Q' cannot exceed $4 \cdot M_{sc}^{PUSCH}$. To ensure a reliable transmission of HARQ-ACK according to the first embodiment, this disclosure provides embodiments to increase the maximum number of coded symbols for HARQ-ACK as shown in the following embodiments:

In some embodiments, the number of coded symbols (or the number of REs per CW (or per layer)) Q' for HARQ-ACK is determined as follows:

$$Q' = \min\left(Q_{ACK}\left(O, M_{sc}^{PUSCH-initial}, N_{symb}^{PUSCH-initial}, \sum_{r=0}^{C-1} K_r, \beta_{offset}^{PUSCH}\right), Q_{ACK}^{max}\right),$$

where $$Q_{ACK}\left(O, M_{sc}^{PUSCH-initial}, N_{symb}^{PUSCH-initial}, \sum_{r=0}^{C-1} K_r, \beta_{offset}^{PUSCH}\right)$$

can be differently calculated depending on whether a PUSCH to carry HARQ-ACK is SIMO or MIMO.

In SIMO transmissions, it is $$\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil$$

In MIMO transmissions, a few embodiments are considered:

In a first embodiment, $$\left\lceil \frac{O \cdot M_{sc}^{PUSCH-initial} \cdot N_{symb}^{PUSCH-initial} \cdot \beta_{offset}^{PUSCH}}{\sum_{r=0}^{C_1(k)-1} K_{r,1} + \sum_{r=0}^{C_2-1} K_{r,2}} \right\rceil,$$

where $C_1(k)$ and $C_2(k)$ are the numbers of codeblocks in TB1 and TB2, respectively, and $K_{r,1}(k)$ and $K_{r,2}(k)$ are the numbers of information bits in r-th codeblock in TB1 and TB2, respectively, which are obtained from the initial PDCCH for the same transport block.

In a second embodiment, $$\left\lceil \frac{O \cdot M_{sc}^{PUSCH-initial} \cdot N_{symb}^{PUSCH-initial} \cdot \beta_{offset}^{PUSCH}}{\sum_{r=0}^{C_1-1} K_{r,1}/\beta_{offset,TB1}^{PUSCH} + \sum_{r=0}^{C_2-1} K_{r,2}/\beta_{offset,TB2}^{PUSCH}} \right\rceil,$$

$\beta_{offset,TB1}^{PUSCH}(k) = \beta_{offset,TB1}^{HARQ-ACK}(k)$, and $\beta_{offset,TB2}^{PUSCH}(k) = \beta_{offset,TB2}^{HARQ-ACK}(k)$, each of which are determined according to [3GPP Technical Specification No. 36.213, version 9.1.0, "E-UTRA, Physical Layer Procedures", March 2010.

In a second embodiment, $$\left\lceil \frac{M_{sc}^{PUSCH-initial} \cdot N_{symb}^{PUSCH-initial}}{\sum_{n=1}^{N_{cw}} \sum_{r=0}^{C_n-1} K_r + O \cdot \beta_{offset}} O \cdot \beta_{offset} \right\rceil,$$

where $\beta_{offset}$ can be dependent on rank.

$Q_{ACK}^{max}$ is determined according to a criteria.

In one example criteria, $Q_{ACK}^{max}$ is determined so that HARQ-ACK coded symbols can occupy the virtual REs corresponding to up to 8 SC-FDM symbols on which HARQ-ACK and RI can be mapped (or 8 columns in table 1100 and table 1200 in each CP configuration). In this case, $Q_{ACK}^{max} = 8 \cdot M_{sc}^{PUSCH}$.

In another example criteria, $Q_{ACK}^{max}$ is determined so that it can ensure no collision between HARQ-ACK symbols and RI symbols as described in the embodiments above for example. In this case, HARQ-ACK can be mapped on:
- virtual REs corresponding to the 4 SC-FDM symbols on which HARQ-ACK can be mapped (or 4 columns in table 1200); or
- virtual REs corresponding to the 4 SC-FDM symbols on which RI can be mapped (or 4 columns in table 1100) less virtual REs already used for mapping RI coded symbols.

Then, $Q_{ACK}^{max} = 8 \cdot M_{sc}^{PUSCH} - Q_{RI}/Q_m$.

FIG. 16 is a table 1600 illustrating the indication of two states by an information element according to an embodiment of this disclosure.

In some embodiments, the HARQ-ACK region is explicitly configured by a UE-specific RRC or PHY signaling. For this purpose, an information element (IE), such as ConfigHARQACKRegion IE, can be defined, which has two states as shown in table 1600.

Depending on the signalled ConfigHARQACKRegion IE value, a UE changes its behavior in step 5 according to table 1600.

When ConfigHARQACKRegion IE is signalled in the PHY, the IE can be mapped to two codepoints in a UL grant DCI carried in the PDCCH. For this purpose, an additional one-bit field can be inserted in DCI format 0 defined in Rel-8/9 LTE, and/or in a UL-MIMO format, say, DCI format 0B to be defined in LTE-Advanced.

Since RI is independently configured of HARQ-ACK transmission for a UE, in some subframes in which HARQ-ACK transmission is scheduled, RI is not simultaneously scheduled. Accordingly, this disclosure provides UE behaviors of transmitting HARQ-ACK in a subframe that depend on whether or not RI is scheduled in the same subframe.

In some embodiments, step 5 is implemented in two different ways, depending on whether RI is scheduled in the same subframe in which HARQ-ACK is scheduled for a UE.

In one example, when RI is scheduled in the same subframe, HARQ-ACK region is kept the same as Rel-8/9 LTE. When RI is not scheduled in the same subframe, HARQ-ACK region is expanded.

In another example, when RI is scheduled in the same subframe, HARQ-ACK region is expanded and step 5 is implemented in such a way that the HARQ-ACK symbols do not collide with the RI symbols allocated by step 3. When RI is not scheduled in the same subframe, HARQ-ACK region is expanded and step 5 is implemented in such a way that HARQ-ACK symbols can also be written in the columns assigned for RI (e.g., the columns listed in table 1100).

In Rel-8/9 LTE, aperiodic CQI report is dynamically triggered by a UL grant with CQI request bit=1. In general, an aperiodic CQI report has larger number of bits than a periodic CQI report, and hence it would occupy more virtual REs.

When some of the embodiments of this disclosure are implemented, there is a chance that CQI/PMI virtual REs are overwritten by HARQ-ACK symbols. When a large number of virtual REs are used for an aperiodic report and HARQ-ACK symbols are overwriting the CQI symbols, the eNodeB may not decode the aperiodic CQI report at all.

Accordingly, this disclosure provides embodiments in which the UE changes its behavior of writing HARQ-ACK symbols in step 5 depending on whether aperiodic CQI report is scheduled or not.

In some embodiments, step 5 is implemented in two different ways, depending on whether an aperodic CQI report is scheduled in the same subframe in which HARQ-ACK is scheduled for a UE. Note that an aperiodic CQI report in subframe n can be triggered by a UL grant with CQI request bit=1 in subframe n−k, where, for example, k=4 in a FDD system.

In one example, when no aperiodic CQI report is scheduled in the subframe, HARQ-ACK region is expanded and step 5 is implemented, for example, according to one of the methods described above. When an aperiodic CQI report is scheduled in the subframe, HARQ-ACK region is kept the same as Rel-8/9 LTE and the interleaving is implemented according to Rel-8/9 LTE.

It is expected that UL MIMO has a large number of RB allocation, and a MIMO PUSCH transmission is likely not to have problem of meeting the HARQ-ACK reliability target.

Accordingly, this disclosure provides embodiments in which a UE changes its behavior of writing HARQ-ACK symbols in step 5 depending on whether or not a MIMO PUSCH would carry HARQ-ACK.

In some embodiments of this disclosure, step 5 is implemented in two different ways, depending on whether a MIMO PUSCH is to carry HARQ-ACK or a SIMO PUSCH is to carry HARQ-ACK.

In one example, when a MIMO PUSCH is to carry HARQ-ACK in the subframe, HARQ-ACK region is kept the same as Rel-8/9 LTE and the interleaving is implemented according to Rel-8/9 LTE. When a SIMO PUSCH is to carry HARQ-ACK in the subframe, HARQ-ACK region is expanded and step 5 is implemented, for example, according to a method described above.

A number of transmission modes and a number of feedback modes are defined in Rel-8/9 LTE specification 3GPP Technical Specification No. 36.213, version 9.1.0, "E-UTRA, Physical Layer Procedures", March 2010. It is expected that additional transmission modes and additional feedback modes will be defined in LTE-advanced specification. A transmission mode has a set of associated feedback modes.

As RI is not fed back in some feedback modes, an implicit rule of enabling HARQ-ACK region expansion can be constructed depending on whether a configured feedback mode to a UE includes RI transmission or not or, alternatively, depending on whether a configured transmission mode to a UE can have a feedback mode carrying a RI transmission or not.

In some embodiments, step 5 is implemented in two different ways, depending on whether a certain feedback mode is configured or not, or, alternatively depending on whether a certain transmission mode is configured or not.

When HARQ-ACK region expansion is configured and a UE is configured to expand the HARQ-ACK region according to some of the embodiments described above, this disclosure provides another alternative of preventing collision of HARQ-ACK and RI.

In some embodiments, step 3 is amended to place RI symbols in SC-FDM symbols so as not to overlap with the SC-FDM symbols used for HARQ-ACK mapping according to some of this disclosure.

As some embodiments give all the columns in table 1100 and table 1200 for HARQ-ACK mapping, the SC-FDM symbols (or columns) on which RI symbols are mapped according to this embodiment are {0,5,6,11} in a normal CP subframe.

In some embodiments, RI and CQI/PMI are jointly encoded, and the jointly coded CQI/PMI/RI are mapped in the CQI region according to Rel-8/9 LTE specification.

In some embodiments, CQI/PMI coded symbols and RI coded symbols are concatenated. In this case, both CQI/PMI and RI are mapped on the top portion of a PUSCH, or the virtual REs marked as CQI in FIG. 7.

Figure 17:
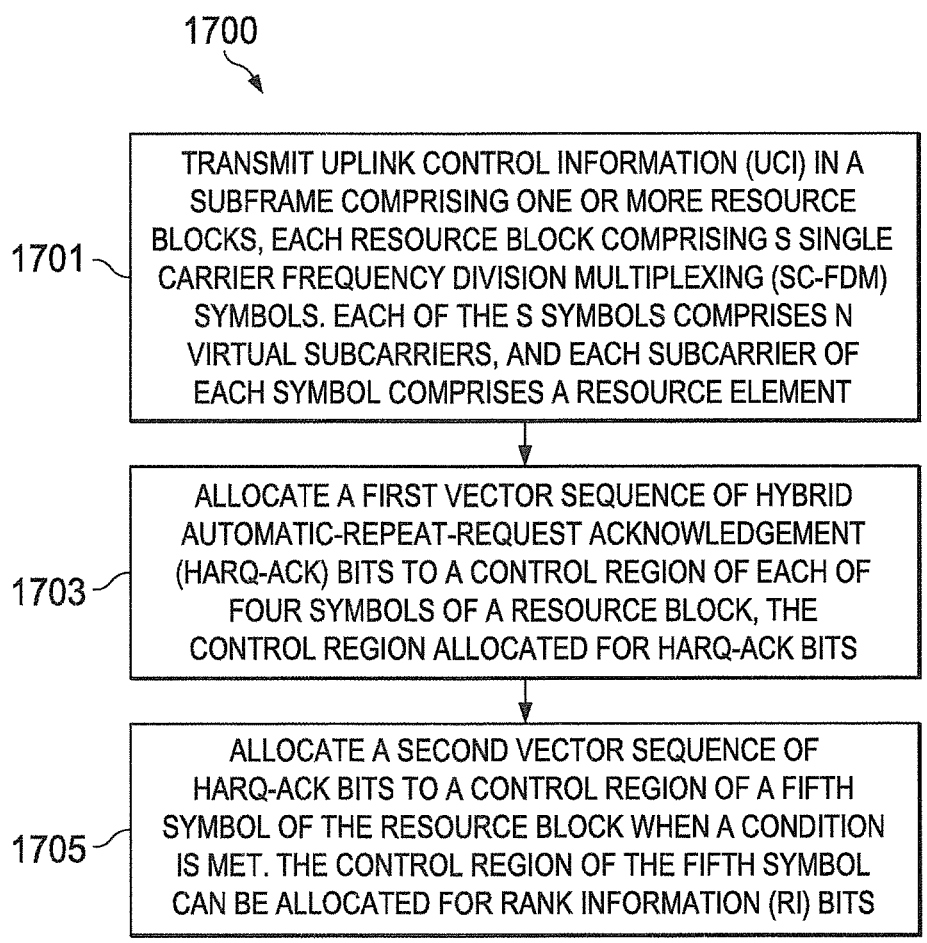
FIG. 17 illustrates a method of operating a subscriber station according to an embodiment of this disclosure.

FIG. 17 illustrates a method 1700 of operating a subscriber station according to an embodiment of this disclosure.

As shown in FIG. 17, method 1700 includes transmitting uplink control information (UCI) in a subframe comprising one or more resource blocks, each resource block comprising S single carrier frequency division multiplexing (SC-FDM) symbols (block 1701). Each of the S symbols comprises N virtual subcarriers, and each subcarrier of each symbol comprises a resource element. The method also comprises allocating a first vector sequence of hybrid automatic-repeat-request acknowledgement (HARQ-ACK) bits to a control region of each of four symbols of a resource block, the control region allocated for HARQ-ACK information bits (block 1703). The method further includes allocating a second vector sequence of HARQ-ACK information bits to a control region of a fifth symbol of the resource block when a condition is met (block 1705). The control region of the fifth symbol can be allocated for rank information (RI) bits.

Figure 18:
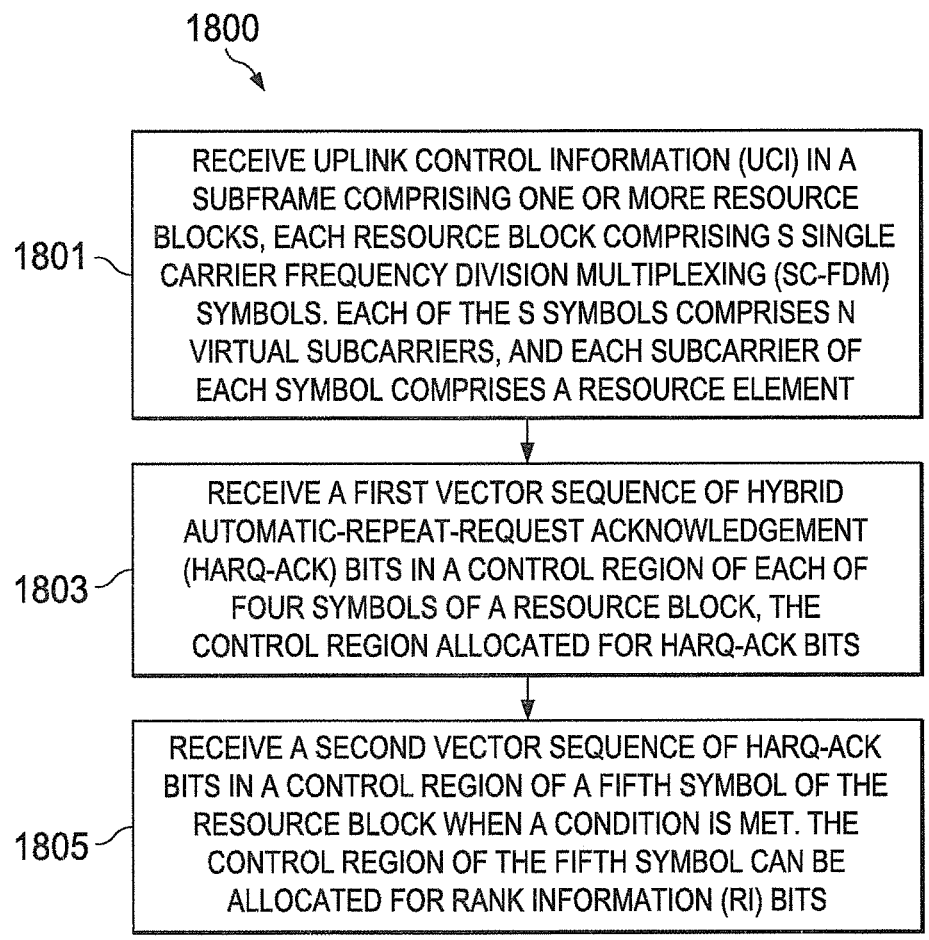
FIG. 18 illustrates a method of operating a base station according to an embodiment of this disclosure.

FIG. 18 illustrates a method 1800 of operating a base station according to an embodiment of this disclosure.

As shown in FIG. 18, the method includes receiving uplink control information (UCI) in a subframe comprising one or more resource blocks, each resource block comprising S single carrier frequency division multiplexing (SC-FDM) symbols (block 1801). Each of the S OFDM symbols comprises N virtual subcarriers, and each subcarrier of each symbol comprises a resource element. The method also includes receiving a first vector sequence of hybrid automatic-repeat-request acknowledgement (HARQ-ACK) bits in a control region of each of four symbols of a resource block, the control region allocated for HARQ-ACK bits (block 1803). The method further includes receiving a second vector sequence of HARQ-ACK bits in a control region of a fifth symbol of the resource block when a condition is met (block 1805). The control region of the fifth symbol can be allocated for rank information (RI) bits.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A subscriber station comprising:
a transmit path circuitry configured to transmit uplink control information (UCI) in a subframe comprising one or more resource blocks, each resource block comprising S single carrier frequency division multiplexing (SC-FDM) symbols, each of the S single carrier frequency division multiplexing (SC-FDM) symbols comprising N virtual subcarriers, and each virtual subcarrier of each symbol comprises a resource element;
and a UCI symbol allocator configured to: allocate a first vector sequence of hybrid automatic-repeat-request acknowledgement (HARQ-ACK) bits to a control region of each of four symbols of a resource block, the control region allocated for HARQ-ACK bits, and allocate a second vector sequence of HARQ-ACK bits to a control region of a fifth symbol of the resource block when a condition is met, wherein the control region of the fifth symbol can be allocated for rank information (RI) bits.

2. The subscriber station in accordance with claim 1, wherein the condition is met when $Q'_{ACK}$ is greater than $4R'_{mux}$, where $Q'_{ACK}=Q_{ACK}/Q_m$, where $Q_{ACK}$ denotes a total number of coded HARQ-ACK information bits in both the first vector sequence and the second vector sequence, $Q_m$ denotes a number of bits per symbol, and where $R'_{mux}=R_{mux}/Q_m$,
$R_{mux}=(H'' \cdot Q_m)/C_{mux}$, $H''=H'+Q'_{RI}$, $Q'_{RI}=Q_{RI}/Q_m$, and $C_{mux}=N_{symb}^{PUSCH}$ (the number of symbols in a physical uplink shared channel, and where $Q_{RI}$ denotes a total number of coded rank information (RI) bits in the subframe.

3. The subscriber station in accordance with claim 1, wherein the condition is met when a particular state is indicated by an information element in at least one of a radio resource control (RRC) signaling and a physical layer (PHY) signaling.

4. The subscriber station in accordance with claim 1, wherein the condition is met when RI bits are not scheduled in the subframe.

5. The subscriber station in accordance with claim 1, wherein the condition is met when a channel quality information (CQI)/precoding matrix information (PMI) report is not scheduled in the subframe, and wherein the control region of the fifth symbol is allocated for PMI/CQI bits.

6. The subscriber station in accordance with claim 5, wherein the CQT/PMI report is an aperiodic CQI/PMI report.

7. The subscriber station in accordance with claim 1 wherein the condition is met when a single input multiple output physical uplink shared channel (SIMO PUSCH) is scheduled to carry the HARQ-ACK information bits.

8. The subscriber station in accordance with claim 1, wherein the second vector sequence of HARQ-ACK bits is allocated to the control region of the fifth symbol in a reverse order as the RI bits are allocated starting from a first virtual subcarrier and moving downwards.

9. The subscriber station in accordance with claim 1, wherein the second vector sequence of HARQ-ACK bits is allocated to the control region of the fifth symbol in a same order as the RI bits are allocated starting from a last virtual subcarrier and moving upwards.

10. The subscriber station in accordance with claim 1, wherein the second vector sequence of HARQ-ACK bits is allocated to the control region of the fifth symbol in a same order as the RI bits are allocated following a largest-numbered RI symbol vector and moving upwards.

11. A method of operating a subscriber station, the method comprising:
transmitting uplink control information (UCI) in a subframe comprising one or more resource blocks, each resource block comprising S single carrier frequency division multiplexing (SC-FDM) symbols, each of the S single carrier frequency division multiplexing (SC- FDM) symbols comprising N virtual subcarriers, and each subcarrier of each symbol comprises a resource element;

allocating a first vector sequence of hybrid automatic-repeat-request acknowledgement (HARQ-ACK) bits to a control region of each of four symbols of a resource block, the control region allocated for HARQ-ACK bits; and allocating a second vector sequence of HARQ-ACK bits to a control region of a fifth symbol of the resource block when a condition is met, wherein the control region of the fifth symbol can be allocated for rank information (RI) bits.

12. The method in accordance with claim 11, wherein the condition is met when $Q'_{ACK}$ is greater than $4R'_{mux}$, where $Q'_{ACK}=Q_{ACK}/Q_m$, where $Q_{ACK}$ denotes a total number of coded HARQ-ACK information bits in both the first vector sequence and the second vector sequence, $Q_m$ denotes a number of bits per symbol, and where $R'_{mux}=R_{mux}/Q_m$, where $R_{mux}=(H''\cdot Q_m)/C_{mux}$, $H''=H'+Q'_{RI}$, $Q'_{RI}=Q_{RI}/Q_m$, and $C_{mux}=N_{symb}^{PUSCH}$ (the number of symbols in a physical uplink shared channel, and where $Q_{RI}$ denotes a total number of coded rank information (RI) bits in the subframe.

13. The method in accordance with claim 11, wherein the condition is met when a particular state is indicated by an information element in at least one of a radio resource control (RRC) signaling and a physical layer (PHY) signaling.

14. The method in accordance with claim 11, wherein the condition is met when RI bits are not scheduled in the subframe.

15. The method in accordance with claim 11, wherein the condition is met when a channel quality information (CQI)/precoding matrix information (PMI) report is not scheduled in the subframe, and wherein the control region of the fifth symbol is allocated for PMI/CQI bits.

16. The method in accordance with claim 15, wherein the CQI/PMI report is an aperiodic CQI/PMI report.

17. The method in accordance with claim 11, wherein the condition is met when a single input multiple output physical uplink shared channel (SIMO PUSCH) is scheduled to carry the HARQ-ACK information bits.

18. The method in accordance with claim 11, wherein the second vector sequence of HARQ-ACK bits is allocated to the control region of the fifth symbol in a reverse order as the RI bits are allocated starting from a first virtual subcarrier and moving downwards.

19. The method in accordance with claim 11, wherein the second vector sequence of HARQ-ACK bits is allocated to the control region of the fifth symbol in a same order as the RI bits are allocated starting from a last virtual subcarrier and moving upwards.

20. The method in accordance with claim 11, wherein the second vector sequence of HARQ-ACK bits is allocated to the control region of the fifth symbol in a same order as the RI bits are allocated following a largest-numbered RI symbol vector and moving upwards.

21. A base station comprising:

a receive path circuitry configured to receive: uplink control information (UCI) in a subframe comprising one or more resource blocks, each resource block comprising S single carrier frequency division multiplexing (SC-FDM) symbols, each of the S single carrier frequency division multiplexing (SC-FDM) symbols comprising N virtual subcarriers, and each subcarrier of each symbol comprises a resource element;

a first vector sequence of hybrid automatic-repeat-request acknowledgement (HARQ-ACK) bits in a control region of each of four symbols of a resource block, the control region allocated for HARQ-ACK bits; and a second vector sequence of HARQ-ACK bits in a control region of a fifth symbol of the resource block when a condition is met, wherein the control region of the fifth symbol can be allocated for rank information (RI) bits.

22. The base station in accordance with claim 21, wherein the condition is met when $Q'_{ACK}$ is greater than $4R'_{mux}$, where $Q'_{ACK}=Q_{ACK}/Q_m$, where $Q_{ACK}$ denotes a total number of coded HARQ-ACK information bits in both the first vector sequence and the second vector sequence, $Q_m$ denotes a number of bits per symbol, and where $R'_{mux}=R_{mux}/Q_m$, where $R_{mux}=(H''\cdot Q_m)/C_{mux}$, $H''=H'+Q'_{RI}$, $Q'_{RI}=Q_{RI}/Q_m$, and $C_{mux}=N_{symb}^{PUSCH}$ (the number of symbols in a physical uplink shared channel, and where $Q_{RI}$ denotes a total number of coded rank information (RI) bits in the subframe.

23. The base station in accordance with claim 21, wherein the condition is met when a particular state is indicated by an information element in at least one of a radio resource control (RRC) signaling and a physical layer (PRY) signaling.

24. The base station in accordance with claim 21, wherein the condition is met when RI bits are not scheduled in the subframe.

25. The base station in accordance with claim 21, wherein the condition is met when a channel quality information (CQI)/precoding matrix information (PMI) report is not scheduled in the subframe, and wherein the control region of the fifth symbol is allocated for PMI/CQI bits.

26. The base station in accordance with claim 25, wherein the CQI/PMI report is an aperiodic CQI/PMI report.

27. The base station in accordance with claim 21, wherein the condition is met when a single input multiple output physical uplink shared channel (SIMO PUSCH) is scheduled to carry the HARQ-ACK information bits.

28. The base station in accordance with claim 21, wherein the second vector sequence of HARQ-ACK bits is allocated to the control region of the fifth symbol in a reverse order as the RI bits are allocated starting from a first virtual subcarrier and moving downwards.

29. The base station in accordance with claim 21, wherein the second vector sequence of HARQ-ACK bits is allocated to the control region of the fifth symbol in a same order as the RI bits are allocated starting from a last virtual subcarrier and moving upwards.

30. The base station in accordance with claim 21, wherein the second vector sequence of HARQ-ACK bits is allocated to the control region of the fifth symbol in a same order as the RI bits are allocated following a largest-numbered RI symbol vector and moving upwards.

31. A method of operating a base station, the method comprising:

receiving uplink control infoimation (UCI) in a subframe comprising one or more resource blocks, each resource block comprising S single carrier frequency division multiplexing (SC-FDM) symbols, each of the S symbols comprising N virtual subcarriers, and each subcarrier of each symbol comprises a resource element;

receiving a first vector sequence of hybrid automatic-repeat-request acknowledgement (HARQ-ACK) bits in a control region of each of four symbols of a resource block, the control region allocated for HARQ-ACK bits; and receiving a second vector sequence of HARQ-ACK bits in a control region of a fifth symbol of the resource block when a condition is met, wherein the control region of the fifth symbol can be allocated for rank information (RI) bits.

32. The method in accordance with claim 31, wherein the condition is met when $Q'_{ACK}$ is greater than $4R'_{mux}$, where $Q'_{ACK}=Q_{ACK}/Q_m$, where $Q_{ACK}$ denotes a total number of coded HARQ-ACK information bits in both the first vector sequence and the second vector sequence, $Q_m$ denotes a number of bits per symbol, and where $R'_{mux}=R_{mux}/Q_m$, where $R_{mux}=(H''\cdot Q_m)/C_{mux}$, $H''=H'+Q'_{RI}$, $Q'_{RI}=Q_{RI}/Q_m$, and $C_{mux}=N_{symb}^{PUSCH}$ (the number of symbols in a physical uplink shared channel, and where $Q_{RI}$ denotes a total number of coded rank information (RI) bits in the subframe.

33. The method in accordance with claim 31, wherein the condition is met when a particular state is indicated by an information element in at least one of a radio resource control (RRC) signaling and a physical layer (PHY) signaling.

34. The method in accordance with claim 31, wherein the condition is met when RI bits are not scheduled in the subframe.

35. The method in accordance with claim 31, wherein the condition is met when a channel quality information (CQI)/precoding matrix information (PMI) report is not scheduled in the subframe, and wherein the control region of the OFDM symbol is allocated for PMI/CQI bits.

36. The method in accordance with claim 35, wherein the CQI/PMI report is an aperiodic CQI/PMI report.

37. The method in accordance with claim 31, wherein the condition is met when a single input multiple output physical uplink shared channel (SIMO PUSCH) is scheduled to carry the HARQ-ACK information bits.

38. The method in accordance with claim 31, wherein the second vector sequence of HARQ-ACK bits is allocated to the control region of the fifth symbol in a reverse order as the RI bits are allocated starting from a first virtual subcarrier and moving downwards.

39. The method in accordance with claim 31, wherein the second vector sequence of HARQ-ACK bits is allocated to the control region of the fifth symbol in a same order as the RI bits are allocated starting from a last virtual subcarrier and moving upwards.

40. The method in accordance with claim 31, wherein the second vector sequence of HARQ-ACK bits is allocated to the control region of the fifth symbol in a same order as the RI bits are allocated following a largest-numbered RI symbol vector and moving upwards.

* * * * *